Patented Oct. 14, 1952

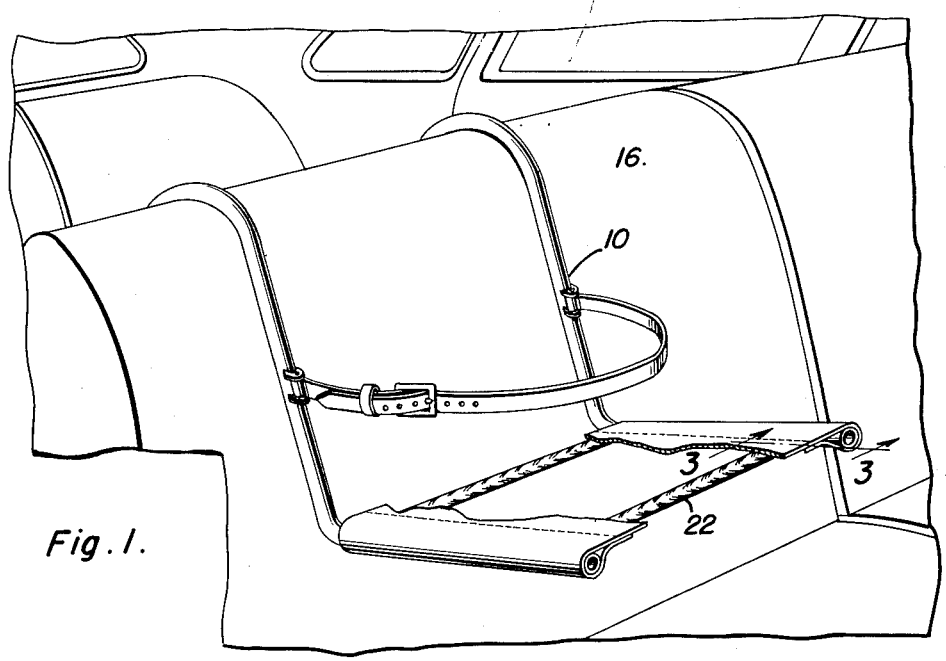
Fig. 1.
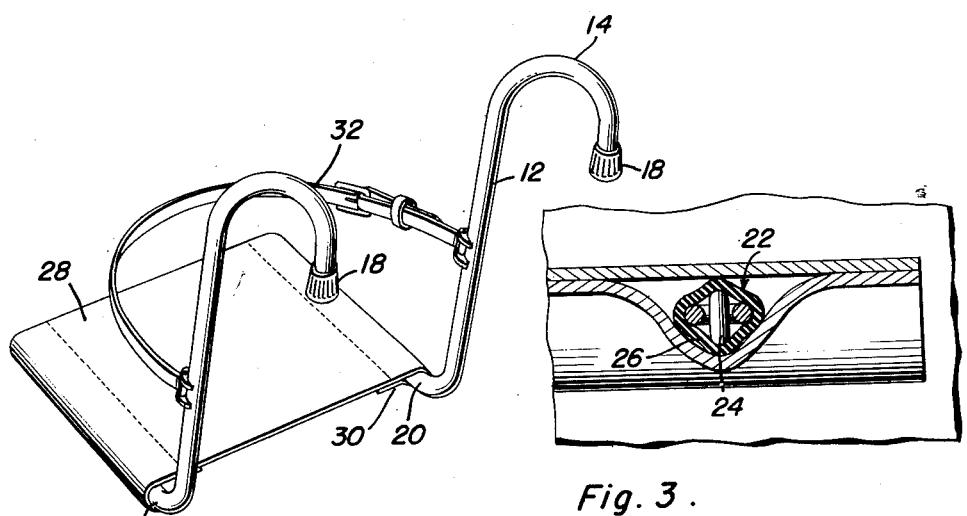
Fig. 2.
Fig. 3.
Inventor
Junior Kenneth Arnold

2,613,724

UNITED STATES PATENT OFFICE 2,613,724

CHILD'S CAR SEAT

Junior Kenneth Arnold, Cedar Rapids, Iowa, assignor of twenty-five per cent to Warren C. Ackley and twenty-five per cent to Hugh V. Hardacre, both of Cedar Rapids, Iowa Application December 1, 1949, Serial No. 130,439

2 Claims. (Cl. 155—11)

This invention comprises novel and useful improvements in children's car seats, and more specifically consists of a collapsible car seat.

The primary object of this invention is to provide a readily collapsible car seat for children which is of simple construction yet adaptable for the purposes intended.

An additional object of this invention, in accordance with the foregoing object, resides in the provision of a child's car seat, which seat will tend to conform to the contour of the body of a child placed upon it, thereby providing a more comfortable seat.

An additional object of this invention, in accordance with the foregoing objects, resides in the provision of a child's car seat, which child's car seat has means attached thereon which will prevent a child placed upon the seat from falling.

An important feature of this invention resides in the provision of means flexibly connecting a pair of seat supporting uprights, permitting the seat to be readily collapsed without the removal of any of its members.

An additional feature of this invention resides in the provision of flexible strips connecting the forward and the rear portions of the seat supporting projections, with a flexible sheet covering said strips and said seat supporting members, the flexible strips retaining the seat supporting members so that the flexible sheet may conform to the contour of the body of a child placed upon the seat.

A further feature of this invention resides in the provision of a flexible, adjustable strap connecting the uprights of said collapsible car seat, and forming means for retaining a child on said seat.

These, and numerous other objects and features of the invention which will become apparent as the following description proceeds, are attained by this invention, an embodiment of which has been illustrated, by way of example only, in the attached drawings, wherein:

Figure 1 is a sectionalized perspective view of the collapsible car seat, shown attached to the back of a car seat, and also showing the flexible straps which connect the seat supporting projections and which support the flexible seat covering.

Figure 2 is a perspective view of the device.

Figure 3 is a sectionalized side view taken substantially on the plane 3—3 of Figure 1, showing the flexible connection attached to one of the seat supporting projections and covered by the seat covering.

Referring now more specifically to the accompanying drawing, wherein like numerals designate similar parts throughout the various views, numeral 10 denotes generally a child's collapsible car seat. The construction of the hooked seat support may take any form, but preferably consists of a formed strip having an upright portion 12, and an arcuately shaped hook 14 formed on one end of said upright, said hook providing means for supporting a child's car seat 10 upon an object such as a car seat 16.

Preferably, resilient caps 18 protect the ends of the arcuately shaped hook 14 from damaging objects that they contact. Formed on the other end of said uprights 12 are seat supporting projections 20, the seat projections 20 having attached thereto flexible connecting means 22, which connecting means may be of any desired construction, such as a flexible chain 24, which is preferably covered by a resilient sheath 26, preferably of rubber.

When the arcuate hooks 14 of the child's car seat 10 are placed on the separate sections of a bifurcated object, such as the front pivoted seat of a two-door sedan, pivotal movement of one of the pivoted seats, in order to permit the exit of a passenger from the rear seat of the sedan, is permitted even though one of the sides of the child's car seat is attached to the pivoted seat, and even though a child is resting upon the child's car seat, the flexible connecting strips 22 allowing the movement of one of the seat supporting projections relative to the other.

Covering the connecting strips 22 is a flexible sheet 28, the flexible sheet having looped ends 30 for receiving the horizontal projection 20. Attached intermediate the ends of the uprights 12 is an adjustable strap 32 which provides a means for preventing a child placed upon the seat from falling therefrom. The flexible and adjustable strap 32 may be attached to the uprights 12 in any desired manner but preferably is pivotally mounted to the upright 12.

From the foregoing, it will be readily seen that there has been provided a readily collapsible child's car seat, which, in addition to the advantages known to children's car seats, permits collapsing of a child's car seat without removing any of its members and, in addition, provides a child's car seat which, when supported on separate sections of a bifurcated car seat, will permit pivotal movement of one of the sections of the car seat, such as is necessary when exiting a passenger from the rear seat of a two-door sedan, without upsetting a child placed upon the collapsible child's seat.

Since various modifications will readily occur to those skilled in the art after consideration of the foregoing specification and the accompanying drawings, it is not intended to limit the invention to the exact construction shown and described, but all suitable modifications and equivalents may be resorted to falling within the scope of the appended claims.

Having described the invention, what is claimed as new is:

1. A child's car seat comprising a pair of laterally spaced uprights having car seat engaging hooks on the upper end, horizontally disposed seat supporting projections extending from the lower end of said uprights in a direction opposed to that in which said hooks extend, a pair of flexible strips secured to said projections and connecting the forward and rear ends thereof, a flexible web overlying said strips and projections, said web having side portions underlying the strips, and means securing the side portions of the web to the rest of the web.

2. The combination of claim 1 wherein said strips include chains formed of a plurality of links, and a resilient sheath encasing each of said chains.

JUNIOR KENNETH ARNOLD.

REFERENCES CITED

The following references are of record in the file of this patent:

UNITED STATES PATENTS

| Number | Name | Date |
|---|---|---|
| 430,703 | Spahn et al. | June 24, 1890 |
| 749,997 | Mehl | Jan. 19, 1904 |
| 1,192,798 | Scott | July 25, 1916 |
| 1,429,867 | Goldsmith | Sept. 19, 1922 |
| 1,977,205 | Plenzig | Oct. 16, 1934 |
| 2,428,088 | McEachern | Sept. 30, 1947 |
| 2,481,382 | Bennett | Sept. 6, 1949 |
| 2,508,822 | Goldberg | May 23, 1950 |